(12) United States Patent
Sepehry-Fard

(10) Patent No.: US 6,473,598 B1
(45) Date of Patent: Oct. 29, 2002

(54) MOST COST-EFFECTIVE ASMMIC-BASED UNIVERSAL MICROWAVE AND MILLIMETER WAVE TRANSCEIVER

(76) Inventor: Fareed Sepehry-Fard, 12309 Saratoga Creek Dr., Saratoga, CA (US) 95070

( * ) Notice: Subject to any disclaimer, the term of this patent is extended or adjusted under 35 U.S.C. 154(b) by 0 days.

(21) Appl. No.: 09/504,233

(22) Filed: Feb. 15, 2000

(51) Int. Cl.⁷ .................................................. H04B 1/38
(52) U.S. Cl. ........................ 455/73; 455/334; 455/552
(58) Field of Search .............................. 455/73, 75, 78, 455/82, 83, 84, 552, 553, 550, 131, 150.1, 334

(56) References Cited

U.S. PATENT DOCUMENTS

| | | | |
|---|---|---|---|
| 5,220,679 A | * 6/1993 | Zametzer et al. | 455/82 |
| 5,335,355 A | * 8/1994 | Tanaka et al. | 455/553 |
| 5,844,939 A | * 12/1998 | Scherer et al. | 455/73 |
| 5,854,985 A | * 12/1998 | Sainton et al. | 455/553 |
| 5,896,562 A | * 4/1999 | Heinonen | 455/78 |

* cited by examiner

*Primary Examiner*—Dwayne Bost
*Assistant Examiner*—QuocHien B. Vuong
(74) *Attorney, Agent, or Firm*—Skjerven Morrill LLP; Norman R. Klivans

(57) ABSTRACT

A radio frequency signal processing system such as an LMDS transceiver includes a receive switch, a first signal reception processing block, a second signal reception processing block, a transmit switch, a first signal transmission processing block, a second signal transmission processing block, and a controller to transmit the incoming radio frequency signal to a selected one of the first and second signal reception processing blocks, and causes the transmit switch to receive the outgoing radio frequency signal from a selected one of the first and second signal transmission processing blocks. Multiple frequency ranges may therefore be handled by a single LMDS transceiver, enabling low-cost mass production of the transceiver.

6 Claims, 11 Drawing Sheets

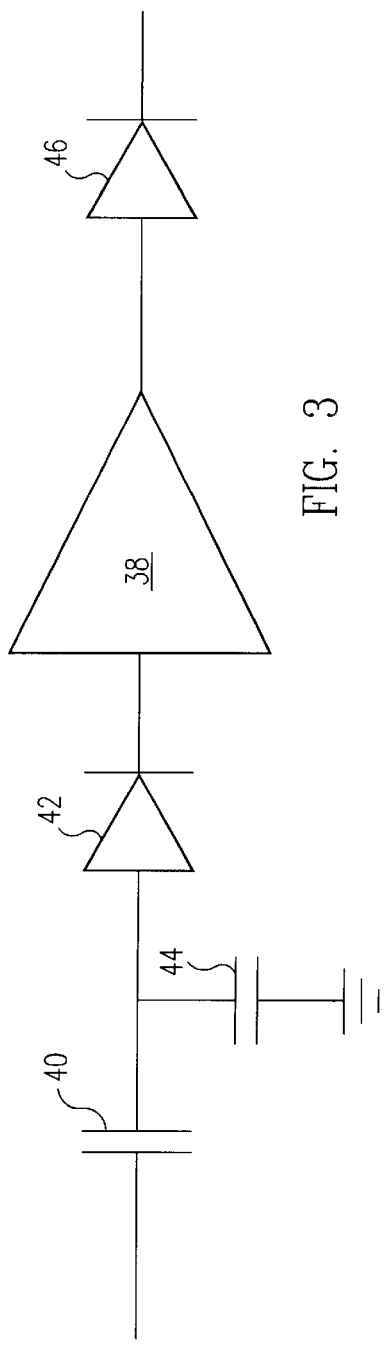
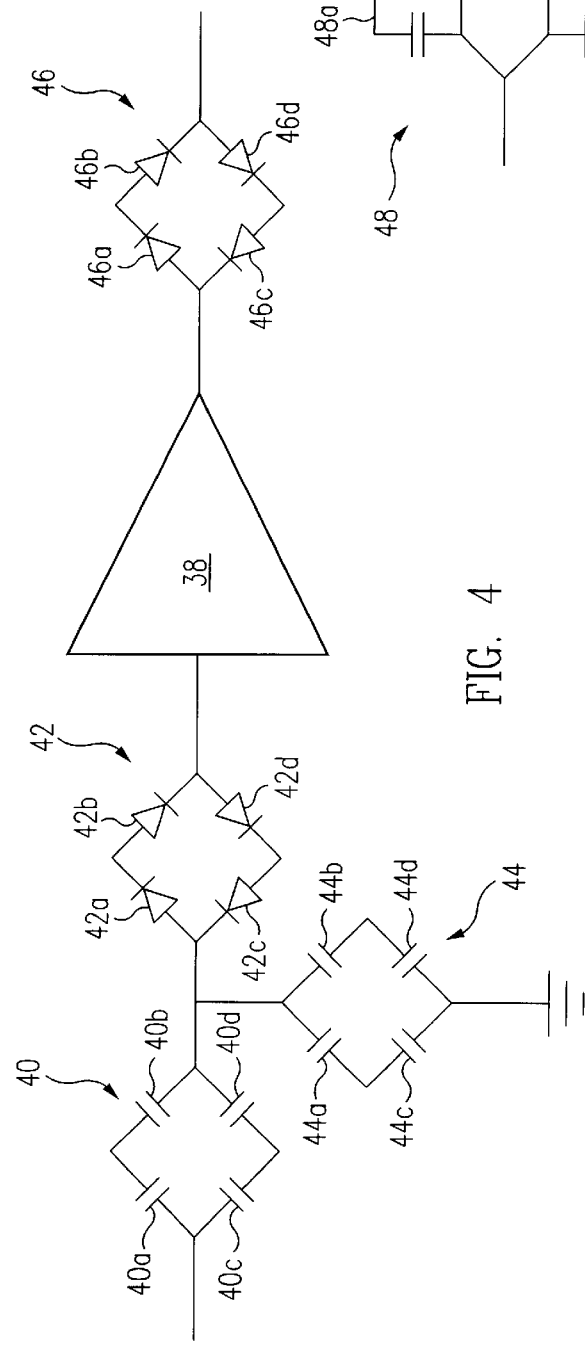
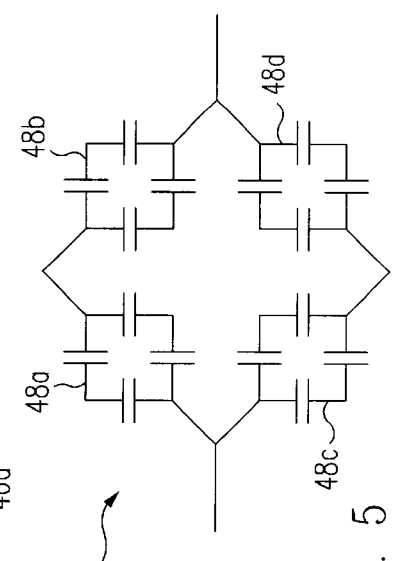
FIG. 3
FIG. 4
FIG. 5

US 6,473,598 B1

MOST COST-EFFECTIVE ASMMIC-BASED UNIVERSAL MICROWAVE AND MILLIMETER WAVE TRANSCEIVER

TECHNICAL FIELD OF THE INVENTION

The present invention relates to radiofrequency signal processing circuitry, and in particular to an ASMMIC-based universal microwave and millimeter wave transceiver.

BACKGROUND OF THE INVENTION

Some standards have been developed for a Local Multipoint Distribution Service (LMDS). However, development in this area has been hampered by, among other things, the cost of consumer premises equipment (CPE) needed for the service. One of the primary components of this cost is the cost of the transceiver for receiving and transmitting radiofrequency (RF) signals. One obstacle to the development of a low-cost LMDS transceiver is the probability that, in different regions or countries, different frequency bands would be available for the service, making mass production of a single LMDS transceiver design difficult.

SUMMARY OF THE INVENTION

Therefore, a need has arisen for a LMDS transceiver that addresses the disadvantages and deficiencies of the prior art. In particular, a need has arisen for a versatile, low-cost LMDS transceiver with high-yield, common footprint integrated circuit chips, capable of handling multiple frequency ranges.

In accordance with one aspect of the present invention, a novel radiofrequency signal processing system such as an LMDS transceiver is disclosed. In one embodiment, the radiofrequency signal processing system includes a receive switch with an input terminal connected to receive an incoming radiofrequency signal. The receive switch has first and second output terminals. A first signal reception processing block processes the incoming radiofrequency signal within a first frequency band. The first signal reception processing block has an input terminal connected to the first output terminal of the receive switch. A second signal reception processing block processes the incoming radiofrequency signal within a second frequency band. The second signal reception processing block has an input terminal connected to the second output terminal of the receive switch. A transmit switch has an output terminal connected to transmit an outgoing radiofrequency signal. The transmit switch has first and second input terminals. A first signal transmission processing block processes the outgoing radiofrequency signal within a third frequency band. The first signal transmission processing block has an output terminal connected to the first input terminal of the transmit switch. A second signal transmission processing block processes the outgoing radiofrequency signal within a fourth frequency band. The second signal transmission processing block has an output terminal connected to the second input terminal of the transmit switch. A controller coupled to the transmit and receive switches causes the receive switch to transmit the incoming radiofrequency signal to a selected one of the first and second signal reception processing blocks, and causes the transmit switch to receive the outgoing radiofrequency signal from a selected one of the first and second signal transmission processing blocks.

An advantage of the present invention is that multiple frequency ranges may be handled by a single LMDS transceiver, enabling low-cost mass production of the transceiver.

BRIEF DESCRIPTION OF THE DRAWINGS

For a more complete understanding of the present invention and for further features and advantages, reference is now made to the following description taken in conjunction with the accompanying drawings, in which:

FIG. 3 is a schematic diagram illustrating the input and output connections to an amplifier;

FIG. 4 is a schematic diagram illustrating alternative input and output connections to an amplifier in accordance with one aspect of the present invention, FIG. 5 is a schematic diagram of one quad arrangement of capacitors;

DETAILED DESCRIPTION OF THE INVENTION

The preferred embodiments of the present invention and their advantages are best understood by referring to FIGS. 1 through 14 of the drawings. Like numerals are used for like and corresponding parts of the various drawings.

Figure 1:
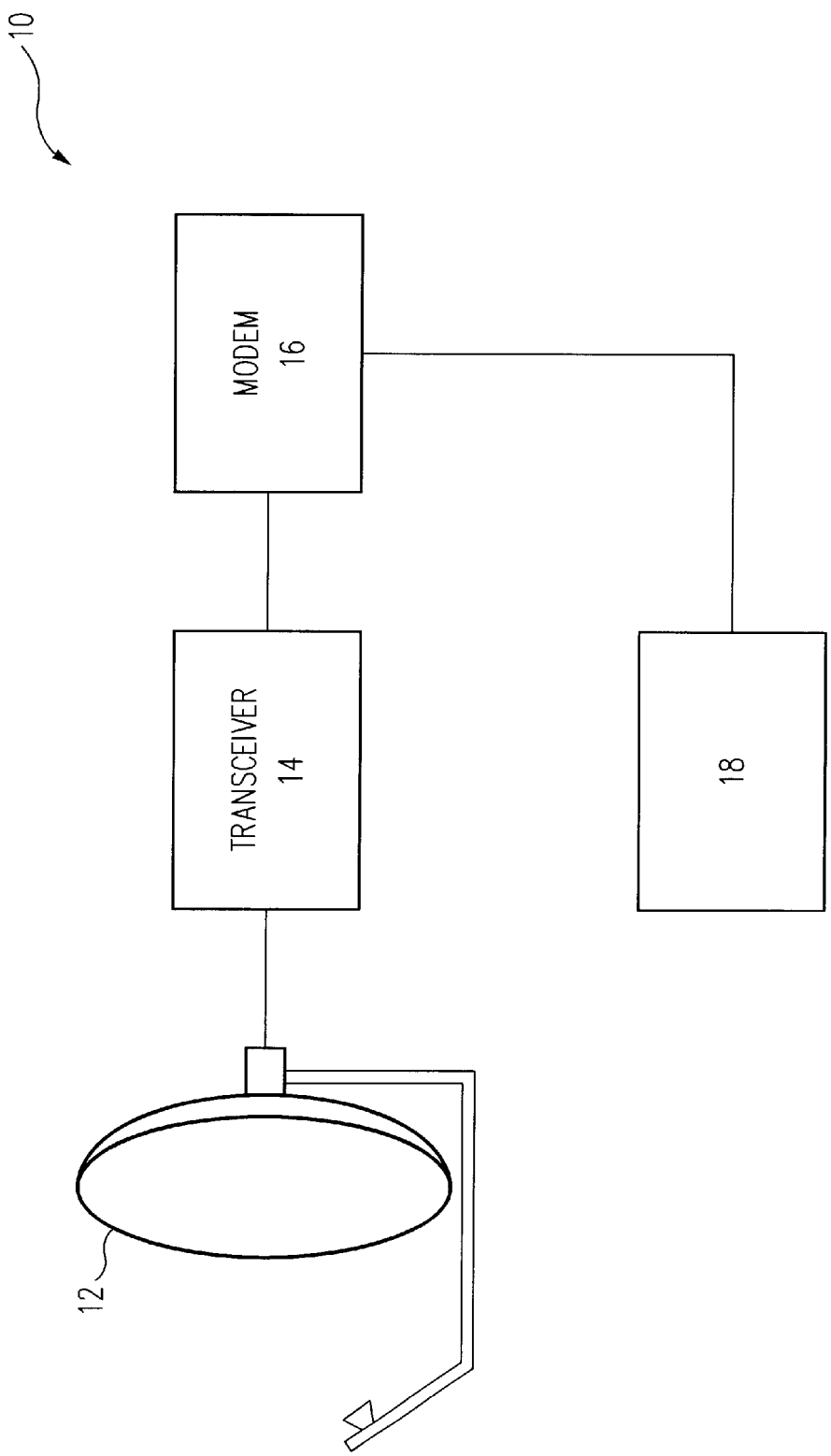
FIG. 1 is a diagram of a local multipoint distribution service (LMDS) communication system.

Referring to FIG. 1, a diagram of a local multipoint distribution service (LMDS) communication system 10 is shown in partial block form. LMDS communication system 10 includes an antenna 12 which communicates with a base station (not shown) via radiofrequency signals within a designated frequency band. Antenna 12 may be a commercially available dish antenna such as the Rantec ASF-438 radio link antenna. Antenna 12 may be installed on the exterior of a subscriber's home or office.

Antenna 12 communicates with a transceiver 14, which processes the signals received by antenna 12. Transceiver 14 also supplies to antenna 12 the signals to be transmitted to the base station. Transceiver 14 communicates with a communication appliance such as a modem 16 for voice, data and video applications, a set top box 17 for broadcast television applications or a video card of a computer 18 for some video applications.

Transceiver 14 and modem 16, if present, may be physically housed in the anterior portion of antenna 12. Thus, antenna 12, transceiver 14 and modem 16 may together form a "universal footprint" outdoor transceiver unit. This unit contains the power supplies (not shown), RF modulation components, and all other components needed to transmit, receive and distribute an RF signal over a range of approximately three to five miles. Operating in the 20–40 GHz frequency range allocated to LMDS, this system provides over 1.3 GHz of communication bandwidth for voice, data, audio and video applications. The design of this system, described in detail below, makes possible broadband communication at a significantly lower cost than previous outdoor transceiver units.

This design drastically reduces part counts and assembly and testing costs associated with conventional outdoor transceiver units. In addition, the modularity of this design allows the quick reconfiguration of the production of the outdoor transceiver units to fit a user's particular technical specifications without costly redesign of the basic unit. By using a library of modules designed around a common footprint, the transceiver can be adapted to widely differing antenna patterns, frequency, modulation, power and duplexing requirements of various applications, telecommunications operators, installations and national regulatory agencies. The actual manufacturing of the units may be subcontracted to well-established custom manufacturers, reducing capital requirements and providing greatly increased flexibility through second and third sourcing of production.

Set top box 17 and/or computer 18 may reside within the home or office serviced by LMDS communication system 10. Modem 16, if present, may communicate with a communication appliance (not shown) within the home or office serviced by LMDS communication system 10. The design of modem 16 and the medium for communication between modem 16 and the communication appliance depends on the type of communication appliance and the particular application for which LMDS communication system 10 is being used.

Figure 2:
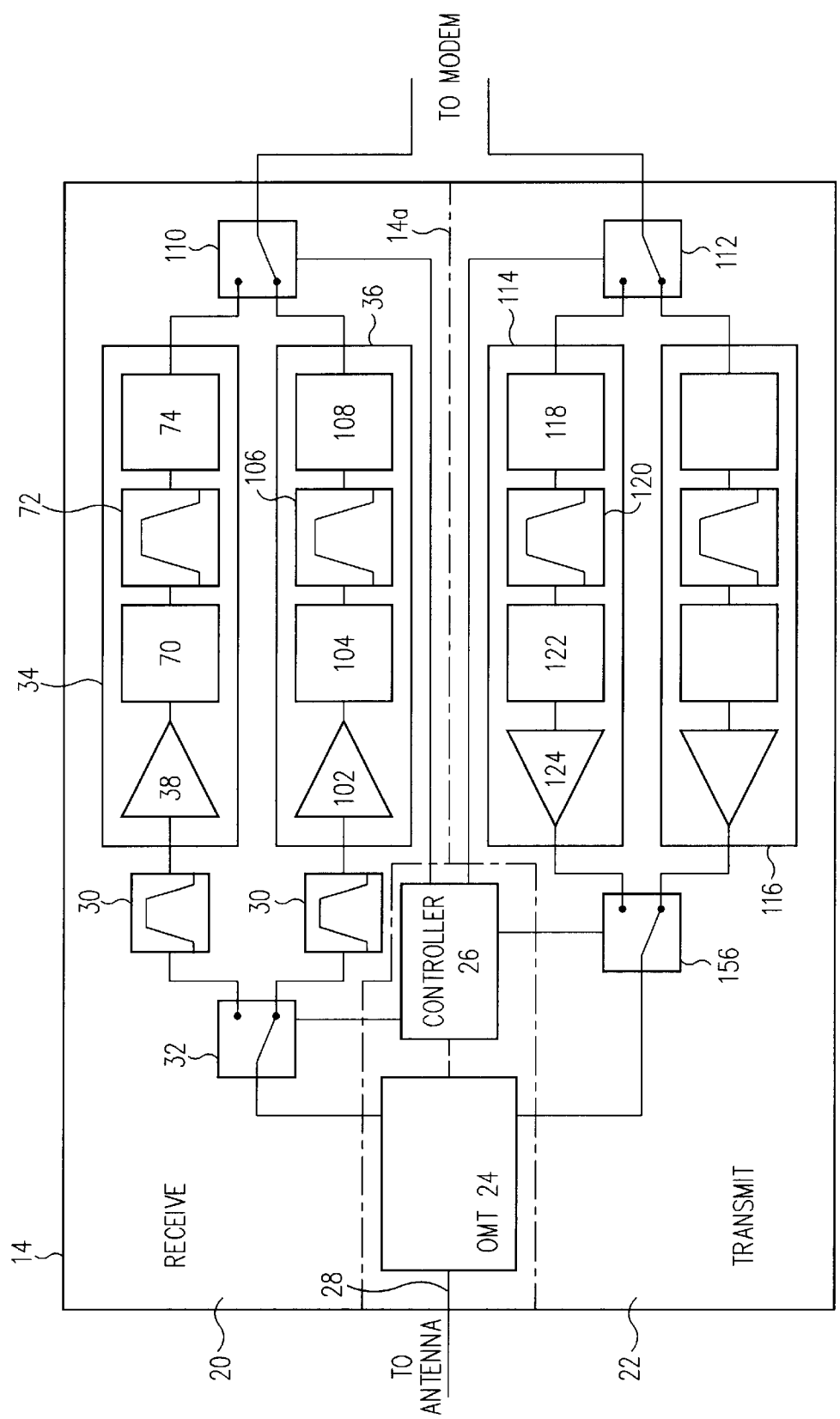
FIG. 2 is a block diagram of an LMDS transceiver designed in accordance with the present invention.

Referring to FIG. 2, a block diagram of an LMDS transceiver 14 is shown. Transceiver 14 has a receive portion 20 and a transmit portion 22, each containing circuitry for its designated function. The two portions 20 and 22 of transceiver 14 are separated for purposes of illustration by dashed line 14a. Transceiver 14 may also include circuitry such as an orthomode transducer (OMT) 24 and controller 26, which do not belong exclusively to either the receive portion 20 or the transmit portion 22, but rather communicate with both portions.

Transceiver 14 and antenna 12 communicate with the base station using a designated frequency band with limited bandwidth. Since antenna 12 may not transmit and receive signals simultaneously in the same frequency range, controller 26 and orthomode transducer 24 allocate the limited bandwidth between receive potion 20 and transmit portion 22. Two schemes that may be used for this bandwidth allocation are frequency division duplexing (FDD) and time division duplexing (TDD).

In frequency division duplexing, as is known, one portion of the designated frequency band is dedicated to signal transmission, which the other portion of the spectrum is dedicated to signal reception. These two frequency sub-bands need not be equal in bandwidth. Controller 26 and orthomode transducer 24 provide bandwidth allocation between receive portion 20 and transmit portion 22.

In time division duplexing, both transmit portion 22 and receive portion 20 use the entire designated frequency band for communication, but at different times.

Controller 26 provides flexible time allocation between receive portion 20 and transmit portion 22 in the manner described below. If transceiver 14 uses time division duplexing, frequency duplexing by orthomode transducer 24 is not necessary.

Regardless of whether FDD or TDD is used to allocated transmit and receive bandwidth, many of the components of transceiver 14 will be the same. In the following description, when a component of transceiver 14 is not the same for FDD and TDD duplexing, those differences will be described for that component.

Orthomode transducer 24 is connected to antenna 12 by a waveguide 28. Orthomode transducer 24 provides transmit signals on waveguide 28 which are polarized orthogonally to the received signals from antenna 12. In this manner, orthomode transducer 24 may provide, for example, 50 dB isolation between the transmit and receive signals carried by waveguide 28.

A received signal is provided to a switch 32, which routes the signal to the appropriate signal processing block 34 or 36. Each signal processing block 34, 36 is designed to accommodate a different frequency range. Thus, depending on the country in which transceiver 14 is being used, and the particular application for which transceiver 14 is being used, only one of the signal processing blocks 34, 36 may be activated. Controller 26 activates switch 32 and determines which signal processing block 34, 36 receives the incoming RF signal. Switch 32, as well as other switches in transceiver 14, may be a single pole, triple- or quadruple-throw switch of conventional design. Controller 26 also activates the signal processing circuitry within the selected signal processing block 34, 36.

When time division duplexing is used, controller 26 divides the time domain between receive portion 20 and transmit portion 22. Thus, during the times allocated from signal transmission by transceiver 14, controller 26 causes switch 32 to present a high impedance at its output, so that the transmitted signal is not processed by a signal processing block 34, 36. Controller 26 also deactivates the selected signal processing block 34, 36, during signal transmission periods, and reactivates it during signal reception periods.

Prior to entering signal processing block 34 or 36, the received signal is provided to a diplexer silver plated filter 30, which provides 35–50 dB isolation between its input and output. In one embodiment, filter 30 is a multistage resonant waveguide filter with eight poles and four, five or six zeros, a bandwidth of 450 MHz, a center frequency of 28.24 GHz, a pass band of 250 MHz, a band edge of 27.32 GHz at –2.723 dB at –50° C. and 27.825 GHz at –8.716 dB at 65° C., a high-end rolloff of 27.95 at –52 dB, a low-end rolloff of 28.06 GHz at –4 dB and an insertion loss of 1.5 dB. With these design parameters, filter 30 may be of conventional design.

Signal processing block 34 will now be described. An incoming signal is received by an amplifier 38. Referring to FIG. 3, a schematic diagram illustrating the input and output connections to amplifier 38 is shown. A capacitor 40 and diode 42 are connected in series between switch 32 and the input of amplifier 38. Capacitor 40 is a DC blocking capacitor which provides DC isolation between the input of amplifier 38 and any upstream components. Diode 42 provides overvoltage and overcurrent protection for amplifier 38. Another capacitor 44 is connected between capacitor 40 and diode 42 in shunt to ground to provide low-pass filtering of the incoming signal. A diode is connected in series with the output of amplifier 38 to prevent signal reflection.

Capacitors 40 and 44 and diodes 42 and 46 are manufactured on the same chip as amplifier 38. While these components provide desired signal isolation and filtering, a manufacturing defect in any one of these components would fatally compromise that signal isolation and filtering, requiring the chip to be discarded. The two most common classes of defects are those that cause a device such as a capacitor 40, 44 or a diode 42, 46 to present either a short circuit or an open circuit. Depending on the type of defect and which component 40, 42, 44, 46 is affected, the above-mentioned defects will either eliminate the protection provided by the affected component 40, 42, 44, 46 or prevent amplifier 38 from functioning at all. Thus, the design shown in FIG. 3 is likely to have a low yield, driving up manufacturing costs.

In accordance with one aspect of the present invention, in order to provide an added measure of protection and the input and output of amplifier 38, quad arrangements of components are used, as shown in FIG. 4. In this design, DC blocking capacitor 40 is actually a quad arrangement of capacitors. Two capacitors 40a and 40b are connected in series, and another two capacitors 40c and 40d are also connected in series. The two series capacitor arrangements are connected in parallel. Thus, a short circuit in either capacitor 40a or 40b will leave the other capacitor functioning to provide DC isolation. Likewise, a short circuit in either capacitor 40c or 40d will leave the other capacitor functioning. An open circuit in either capacitor 40a or 40b will leave the other capacitors 40c and 40d to provide an input path for the incoming signal. Likewise, an open circuit in either capacitor 40c or 40d will leave the other capacitors 40a and 40b to provide an input path to amplifier 38. This quad arrangement 40 is therefore fault-tolerant for any one fault that occurs due to a manufacturing defect, and is even fault-tolerant for some limited multiple-fault combinations.

In a similar fashion, capacitor 44 and diodes 42 and 46 are also quad arrangements of components. These quad arrangements maximize the yield of the design, decreasing manufacturing costs.

It will be understood that quad arrangements 40 and 44 are capacitive elements that take the place of capacitors 40 and 44 in FIG. 3. Furthermore, it will be understood that other capacitive elements, including fault-tolerant series and parallel arrangements of capacitors, may be substituted for quad arrangements 40 and 44. Likewise, other diode elements, including fault-tolerant series and parallel arrangements of diodes, may be substituted for quad arrangements 42 and 46.

Additional increase in yield found by additional redundancy, such as that shown in FIG. 5. In that figure, an arrangement 48 of capacitive elements is shown. Four capacitive elements 48a, 48b, 48c and 48d are configured in a quad arrangement. Each one of the capacitive elements 48a, 48b, 48c, 48d is itself a quad arrangement of capacitors. It will be appreciated that this design is fault-tolerant to the extent that multiple faults within a capacitive element 48a, 48b, 48c, 48d sufficient to completely disable that element can be tolerated. The list of fault combinations which may be accommodated by this design is extensive, and will not be recounted here. This design may be used for each capacitive element 40, 44 shown in FIG. 3, and a corresponding arrangement of diodes may be used for each diode element 42, 46 shown in FIG. 3.

The phrase "quad arrangement," as used herein, refers to an arrangement of components having at least four legs, each leg having at least one of the components, in which two of the legs are arranged in series, while another two legs are also arranged in series and the two series arrangements are connected in parallel. Thus, both FIGS. 4 and 5 may be said to show quad arrangements of capacitors, while FIG. 5 may also be described as a quad arrangement of quad arrangements of capacitors.

The input and output protection arrangement illustrated in FIG. 4 for amplifier 38 may be used to protect any circuit element in transceiver 14. Indeed, in one embodiment, every component of signal processing blocks 34 and 36 shown in FIG. 2 is protected using this arrangement. The sizes of the capacitors and diodes used in the arrangement may be varied according to the component for which protection is being provided.

Figure 6:
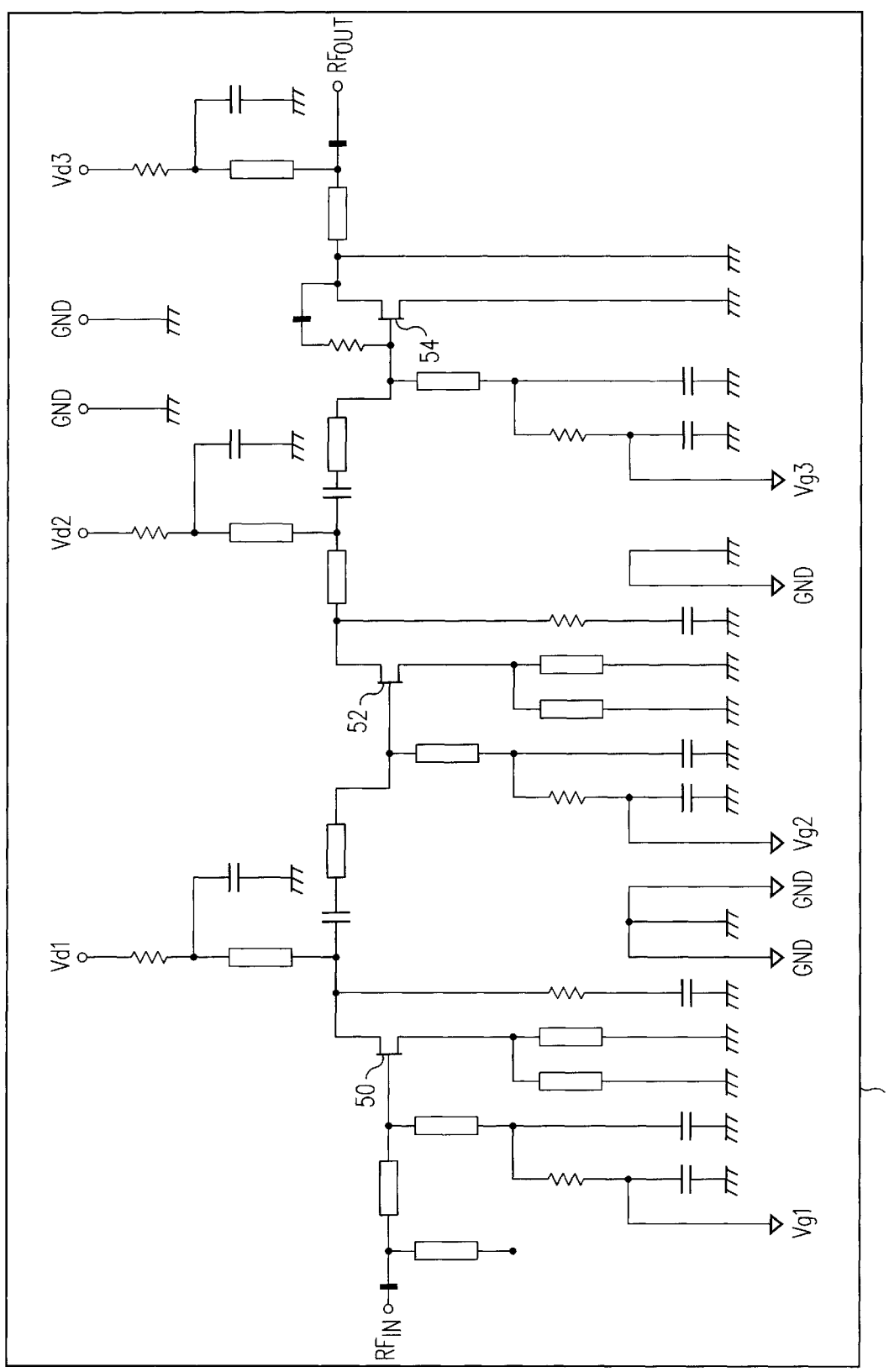
FIG. 6 is a exemplary equivalent schematic diagram for an amplifier used in the LMDS transceiver.

In one exemplary embodiment, amplifier 38 has a gain of at least 20 dB, a noise figure less than 2.5 dB, a third-order intercept ($IP_3$) greater than 20 dBm, and a frequency range of at least 23.5–26.35 GHz. An exemplary equivalent schematic diagram for amplifier 38 is shown in FIG. 6. In this diagram, open rectangles represent parasitic resistances, while the standard resistor symbols represent resistors deliberately built into the design. Likewise, solid rectangles are used to represent parasitic capacitances, while standard capacitor symbols are used to represent capacitors deliberately built into the design. In this embodiment, amplifier 38 is a three-stage amplifier. The input signal $RF_{IN}$ is amplified at three amplifying transistors 50, 52 and 54 and an output signal $RF_{OUT}$ is generated. The input voltages $V_{g1}$, $V_{g2}$ and $V_{g3}$ provide bias voltages for the respective gates of the three amplifying transistors 50, 52 and 54. Likewise, the three input voltages $V_{d1}$, $V_{d2}$ and $V_{d3}$ provide drain voltages for the three amplifying transistors 50, 52 and 54, respectively. Amplifier 38 may reside on its own p-HEMT chip.

The output signal from amplifier 38 is received by a sub-harmonic mixing system 70, which serves to shift the frequency of the incoming RF signal downward. In one embodiment, sub-harmonic mixing system 70 has a frequency range of 23.5–26.35 GHz, a conversion loss less than 10 dB, a third-order intercept ($IP_3$) greater than 20 dBm and an IF bandwidth of 6–8 GHz.

Figure 7:
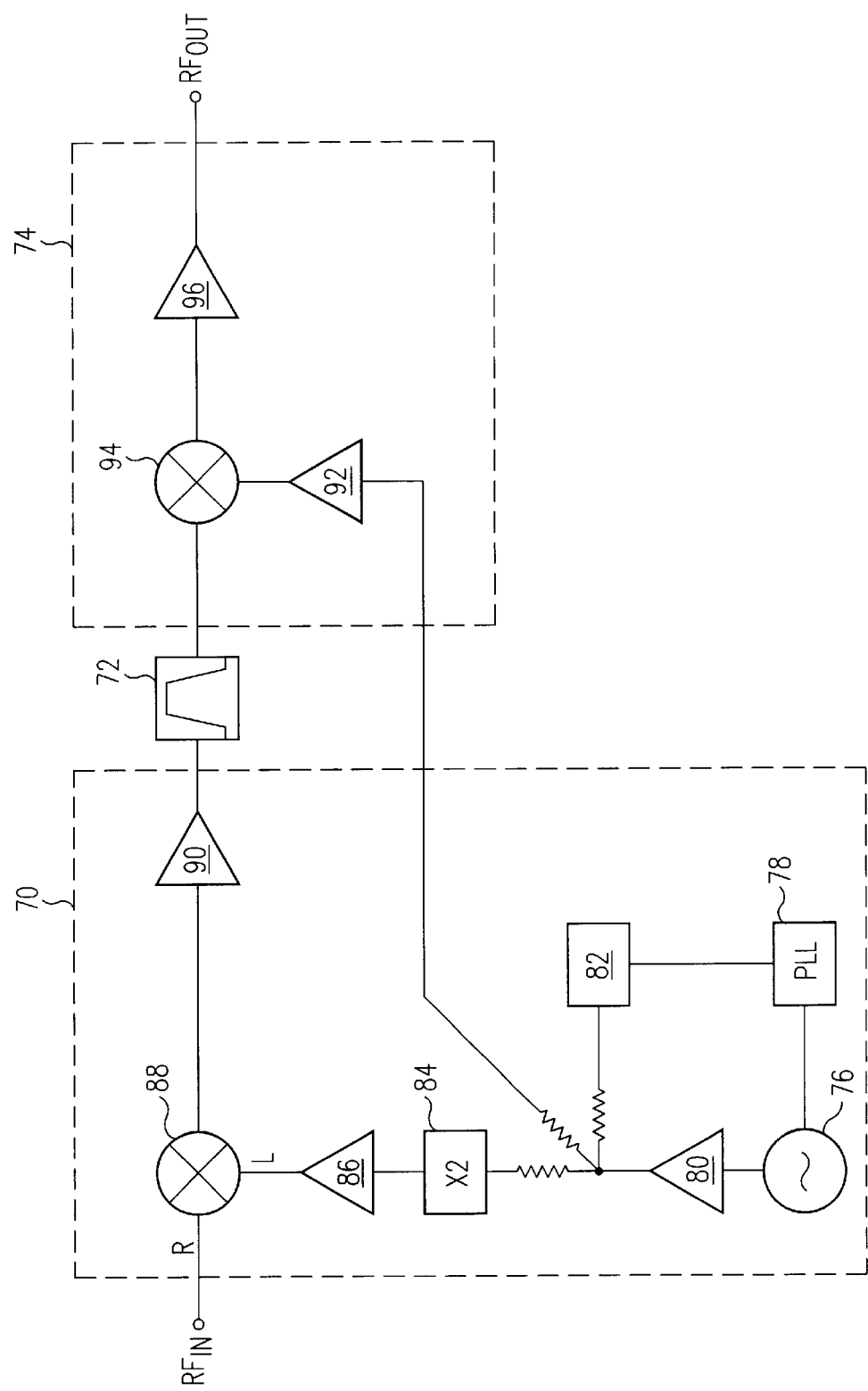
FIG. 7 is a block diagram of a sub-harmonic mixing system, a filter and a double-balanced mixer system used in the LMDS transceiver.

Referring to FIG. 7, a block diagram of sub-harmonic mixing system 70 and two additional downstream components, a filter 72 and a double-balanced mixer system 74, is shown. Sub-harmonic mixing system 70 includes a local oscillator 76, a phase locked loop 78, an amplifier 80, a frequency divider 82, a frequency doubler 84, an amplifier 86, a sub-harmonic mixer 88 and an output amplifier 90. All of these components of sub-harmonic mixing system 70 may be fabricated on a single III-V compound (e.g. GaAs) semiconductor MMIC chip using MESFET technology, except phase locked loop 78, which may be located off-chip.

Local oscillator 76 is a voltage-controlled sinusoidal oscillator which, in cooperation with amplifier 80, divide-by-2 frequency divider 82 and phase locked loop 78 generates a constant-frequency oscillator signal in a known manner. Frequency divider 82 and phase locked loop 78 are of conventional design. In one embodiment, local oscillator 76 produces an output signal in the frequency range of 4.51–4.84 GHz, with an output power of over 0 dBm and a closed loop phase noise of less than −97 dBc/Hz at a 10 kHz offset.

Figure 8:
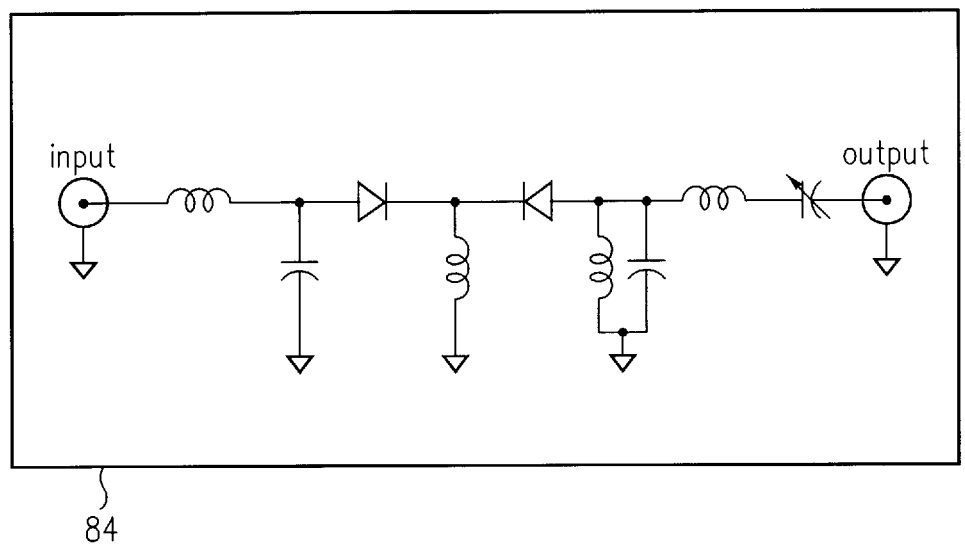
FIG. 8 is an exemplary schematic diagram for a frequency doubler used in the LMDS transceiver.

The signal from amplifier 80 is doubled in frequency by frequency doubler 84. Referring to FIG. 8, an exemplary schematic diagram for frequency doubler 84 is shown. This schematic diagram is for a two-diode odd-order frequency multiplier. Frequency doubler 84 may provide good phase noise performance, particularly if the diodes of frequency doubler 84 are Sow flicker diodes. Flicker intercept levels as low as −148 dBc or even lower may be attainable. Frequency doubler 84 may be connected in series with input and output band pass filters (not shown) to control unwanted multiplier products and harmonics, an output amplifier (not shown) to boost output levels and/or an output attenuator (not shown) for enhanced isolation.

The output signal from frequency doubler 84 is amplified by amplifier 86, which in one embodiment is a three-stage amplifier with a gain of greater than 15 dB, an $IP_3$ of greater than 25 dBm, a noise figure of 3.5 dB and a frequency range of at least 9.02–9.68 GHz.

The output of amplifier 86 is provided as a local oscillator signal input (designated "L") for sub-harmonic mixer 88. The RF input signal $RF_{IN}$ (or simply "R") from amplifier 38 is also provided to sub-harmonic mixer 88, which produces an output signal with a frequency $f_1$ determined by Equation (1):

$$f_1 = f(R) - 2f(L) \qquad (1)$$

In Equation (1), f(R) is the frequency of input signal $RF_{IN}$, while f(L) is the frequency of the local oscillator input (L) to sub-harmonic mixer 88. For an input frequency f(R) of 23.5–26.35 GHz and a local oscillator input frequency f(L) of 9.02–9.68 GHz, the output signal from sub-harmonic mixer 88 has a frequency range of 5.46–8.99 GHz.

The output signal from sub-harmonic mixer 88 is provided to an amplifier 90, which has a gain of greater than 10 dB, an $IP_3$ of greater than 23 dBm, a noise figure of less than 6 dB and a frequency range of at least 5.46–8.99 GHz.

Figure 9:
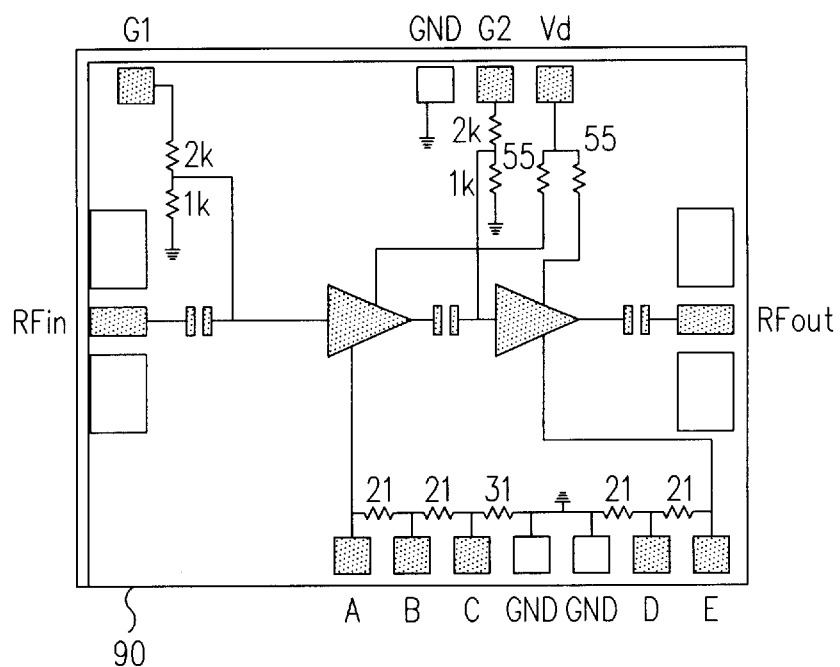
FIG. 9 is an exemplary schematic diagram of another amplifier used in the LMDS transceiver.

Referring to FIG. 9, an exemplary schematic diagram of amplifier 90 is shown. In this embodiment, amplifier 90 is a two-stage amplifier. One biasing scheme for amplifier 90 which results in low noise and low power consumption is to set supply Vd=4V, while pads B and D are grounded and all other pads are not connected. This 25 is equivalent to a scheme in which Vd=4V, pads A through E and not connected and G1=G2=2.5V. An alternative biasing scheme that results in low noise and high output power is to set supply voltage Vd=5V, while pads B and E are grounded and all other pads are not connected. This scheme is equivalent to one in which Vd=5V, pads A through E and not connected, G1=2.5V and G2=1V.

The output signal from sub-harmonic mixing system 70 is provided to a filter 72. In one embodiment, filter 72 is an antipodal ridge waveguide IF filter acting as a high pass filter with a pass band having a lower limit of 5.1 GHz. With these design parameters, filter 72 may be of conventional design.

The output signal from filter 72 is provided to a double-balanced mixing system 74, which serves to further decrease the frequency of the received RF signal. As shown in FIG. 7, double-balanced mixing system 74 uses the local oscillator signal from sub-harmonic mixing system 70. Specifically, the output from the VCO buffer amplifier 80, which in one embodiment has a frequency range of 4.51–4.84 GHz, is provided to an amplifier 92, which has a gain of at least 23 dB, a noise figure of 7.5 dB, a frequency range of at least 4.51–4.84 GHz and a maximum voltage standing wave ratio (VSWR) of 2.0:1.

The output of amplifier 92 is provided as a local oscillator signal (L) to a double-balanced mixer 94. The output signal from filter 72 is provided to double-balanced mixer 94 as an RF signal input (R). Double-balanced mixer 94 generates an output signal with a frequency $f_2$ given by Equation (2):

$$f_2 = f(R) - f(L) \qquad (2)$$

The output signal from double-balanced mixer 94 is provided to an amplifier 96, which has a gain of at least 22 dB, a noise figure of seven dB, a third-order intercept ($IP_3$) greater than 27 dBm, and a frequency range of at least 950–2150 MHz.

All three components of double-balanced mixing system 74 may reside on the same GaAs semiconductor MESFET MMIC chip.

Signal processing block 36 will now be described. Signal processing block 36 is similar in design to signal processing block 34. However, while signal processing block 34 is designed to handle an input signal frequency range of 23.5–26.35 GHz, signal processing block 36 is designed to handle a frequency range of 26.35–31.3 GHz.

An incoming signal is received by an amplifier 102. Amplifier 102 may be similar in design to amplifier 38 as described above and illustrated in FIG. 6. In one embodiment, amplifier 102 has a gain of at least 20 dB, a noise figure less than 2.5 dB, a third-order intercept ($IP_3$) greater than 20 dBm, and a frequency range of 26.35–31.3 GHz. Amplifier 102 may reside on its own p-HEMT chip.

Downstream of amplifier 102 are a sub-harmonic mixing system 104, a filter 106 and a double-balanced mixing system 108. These components may be similar in design to the corresponding components of signal processing block 34. Indeed, in one embodiment, a single sub-harmonic mixing system 70, filter 72 and double-balanced mixing system 74 may be shared by signal processing blocks 34 and 36, eliminating the need for sub-harmonic mixing system 104, a filter 106 and a double-balanced mixing system 108.

In one embodiment, sub-harmonic mixing system 104 has a frequency range of 26.35–31.3 GHz, a conversion loss less than 10 dB, a third-order intercept ($IP_3$) greater than 20 dBm and an IF bandwidth of 6–8.

The block diagram shown in FIG. 7 for sub-harmonic mixing system 70, filter 72 and double-balanced mixer system 74 may also be used to describe sub-harmonic mixing system 104, filter 106 and double-balanced mixing system 108. For sub-harmonic mixing system 104 and double-balanced mixing system 108, a local oscillator input frequency f(L) of 10.445–11.155 GHz is used to generate an output frequency from sub-harmonic mixing system 104 of 5.46–8.99 GHz.

Filter 106 may be similar in design to filter 72. In one embodiment, filter 106 filter 72 is an antipodal ridge waveguide IF filter acting as a high pass filter with a pass band having a lower limit of 5.1 GHz.

Double-balanced mixing system 108 may be similar in design to double-balanced mixing system 74. Double-balanced mixing system 108 uses the local oscillator from sub-harmonic mixing system 104 (or alternatively an independent local oscillator) to generate an output frequency range of 950–2150 MHz.

The output signals from signal processing blocks 34 and 36 are provided to an output switch 110, which is controlled by controller 26. Output switch 110 determines which output signal is transmitted to modem 16, set top box 17 or computer 18.

Referring once again to FIG. 2, the circuitry of transmit portion 22 of transceiver 14 will now be described. An incoming signal from modem 16, set top box 17 or computer 18 is received at an input switch 112, which is controlled by controller 26. Input switch 112 determines which one of two or more signal processing blocks 114, 116 receives the incoming signal. Input switch 112 may be similar in design to output switch 110 described above.

Signal processing block 114 will now be described. Like signal processing blocks 34 and 36, signal processing blocks 114 and 116 may be similar in design but configured to handle different frequency ranges.

Figure 10:
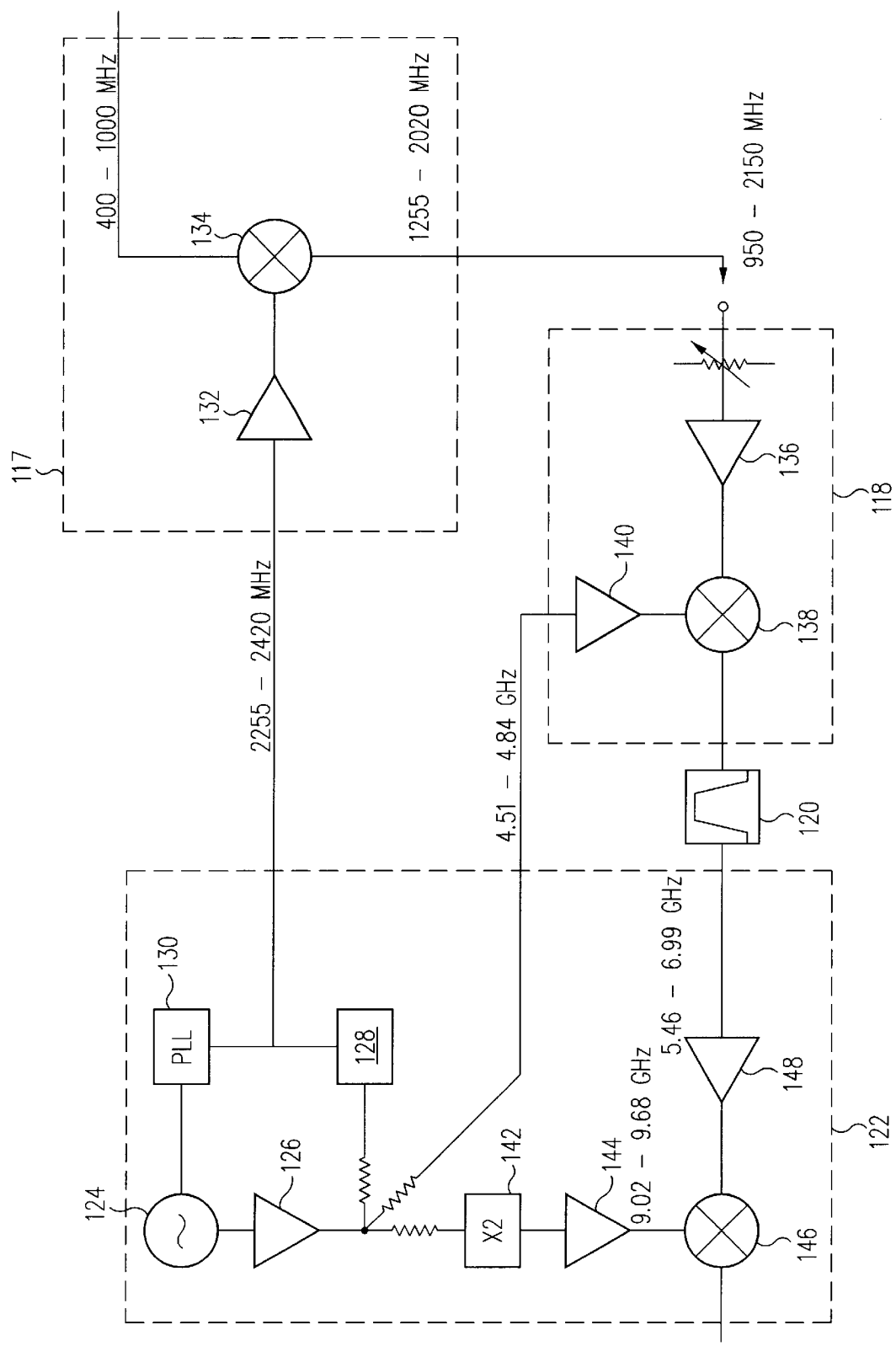
FIG. 10 is a block diagram of a double-balanced mixing system, a filter and a sub-harmonic mixing system used in the LMDS transceiver.

Signal processing block 114 includes a double-balanced mixing system 118, a filter 120, a sub-harmonic mixing system 122 and an amplifier 124. Referring to FIG. 10, a block diagram of double-balanced mixing system 118, filter 120 and sub-harmonic mixing system 122 is shown.

A voltage-controlled oscillator 124, amplifier 126, voltage divider 128 and phase locked loop 130 are configured in a feedback arrangement to generate a constant frequency local oscillator signal. Voltage-controlled oscillator 124, amplifier 126, voltage divider 128 and phase locked loop 130 may have the same design and the same frequency output as the corresponding components of sub-harmonic mixing system 70 shown in FIG. 7. The local oscillator signal and derivations therefore are used in double-balanced mixing system 118 and sub-harmonic mixing system 122, as well as an optional UHF up-converter 117.

In one embodiment, UHF up-converter 117 may be used to increase the frequency of the incoming signal from, for example, a 400–1000 MHz to a 1255–2020 MHz range. In this embodiment, UHF up-converter receives a local oscillator signal in the 2255–2420 MHz range from the output of frequency divider 128. This signal is amplified by an amplifier 132 and combined with the incoming RF signal in a L+R mixer 134. The resultant signal, in the frequency range of 1255–2020 MHz, is provided to an input of double-balanced mixing system 118. In an alternative embodiment, UHF up-converter 117 is omitted and an RF input signal in the frequency range of 950–2150 MHz is supplied directly to double-balanced mixing system 118.

Double-balanced mixing system 118 includes amplifiers 136 and 140 and a double-balanced mixer 138, which may have the same design as the corresponding components of double-balanced mixing system 74 described previously and shown in FIG. 7, with the following exceptions: amplifier 136 is an input amplifier that is in other respects the same as output amplifier 96, and double-balanced mixer 138 is, in one embodiment, a L+R mixer, providing up-conversion rather than down-conversion of input signal frequency. For an input signal frequency range of 950–2150 MHz and a local oscillator frequency of 4.51–4.84 GHz, double-balanced mixing system 118 generates an output signal in the frequency range 5.48–6.99 GHz.

The output signal from double-balanced mixing system 118 is provided to filter 120 which may have the same design as filter 72 described previously and shown in FIG. 7. The filtered signal is provided to the input of sub-harmonic mixing system 122. In addition to oscillator 124, amplifier 126, frequency divider 128 and phase locked loop 130, sub-harmonic mixing system 122 includes a frequency doubler 142, an amplifier 144, a sub-harmonic mixer 146 and an input amplifier 148, all of which may be substantially the same in design as the corresponding components of sub-harmonic mixing system 70 previously described and shown in FIG. 7, with the exceptions that amplifier 148 is an input amplifier rather than an output amplifier and sub-harmonic mixer 146 is a 2L+R mixer, providing up-conversion rather than down-conversion of input signal frequency.

Figure 11:
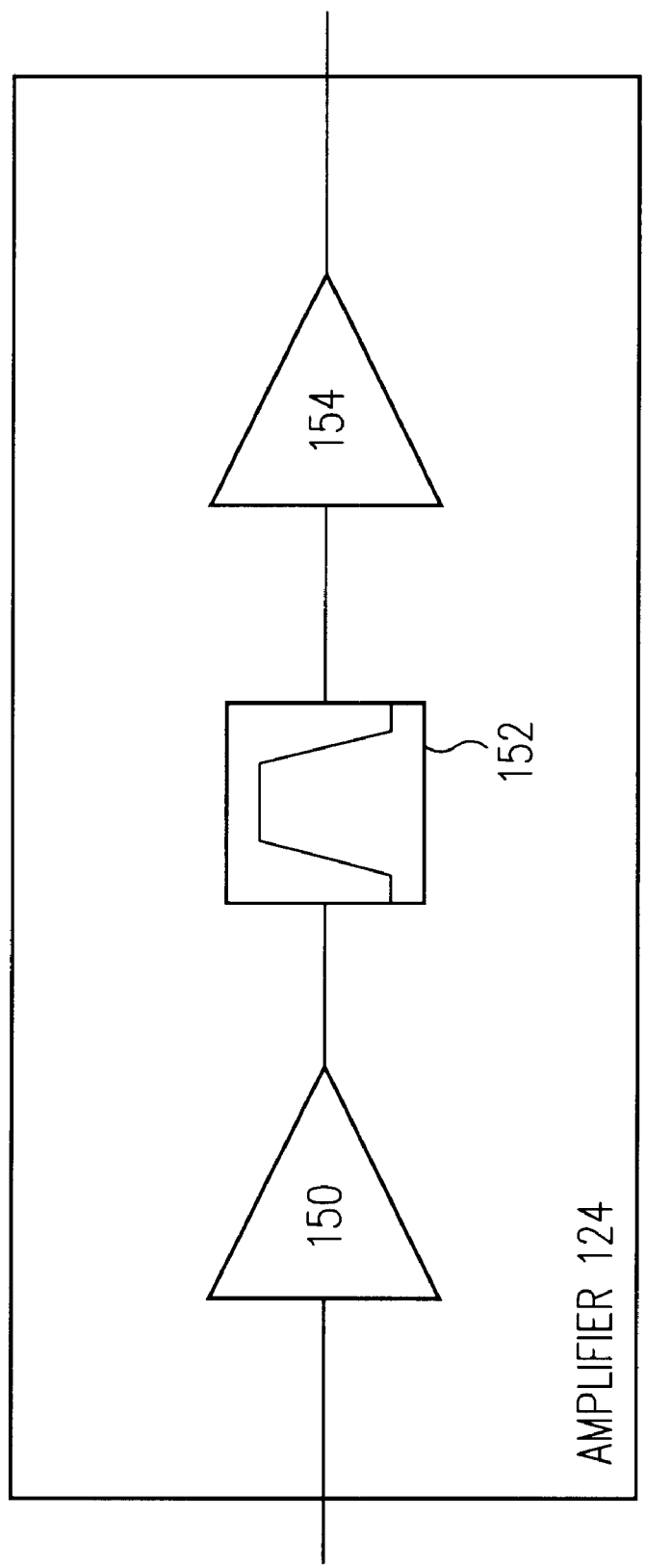
FIG. 11 is a block diagram of another amplifier used in the LMDS transceiver.

The output signal from sub-harmonic mixing system 122 is provided to amplifier 124. Referring to FIG. 11, a block diagram of amplifier 124 is shown. Amplifier 124 includes a driver amplifier 150, a filter 152 and an output amplifier 154.

Figure 12:
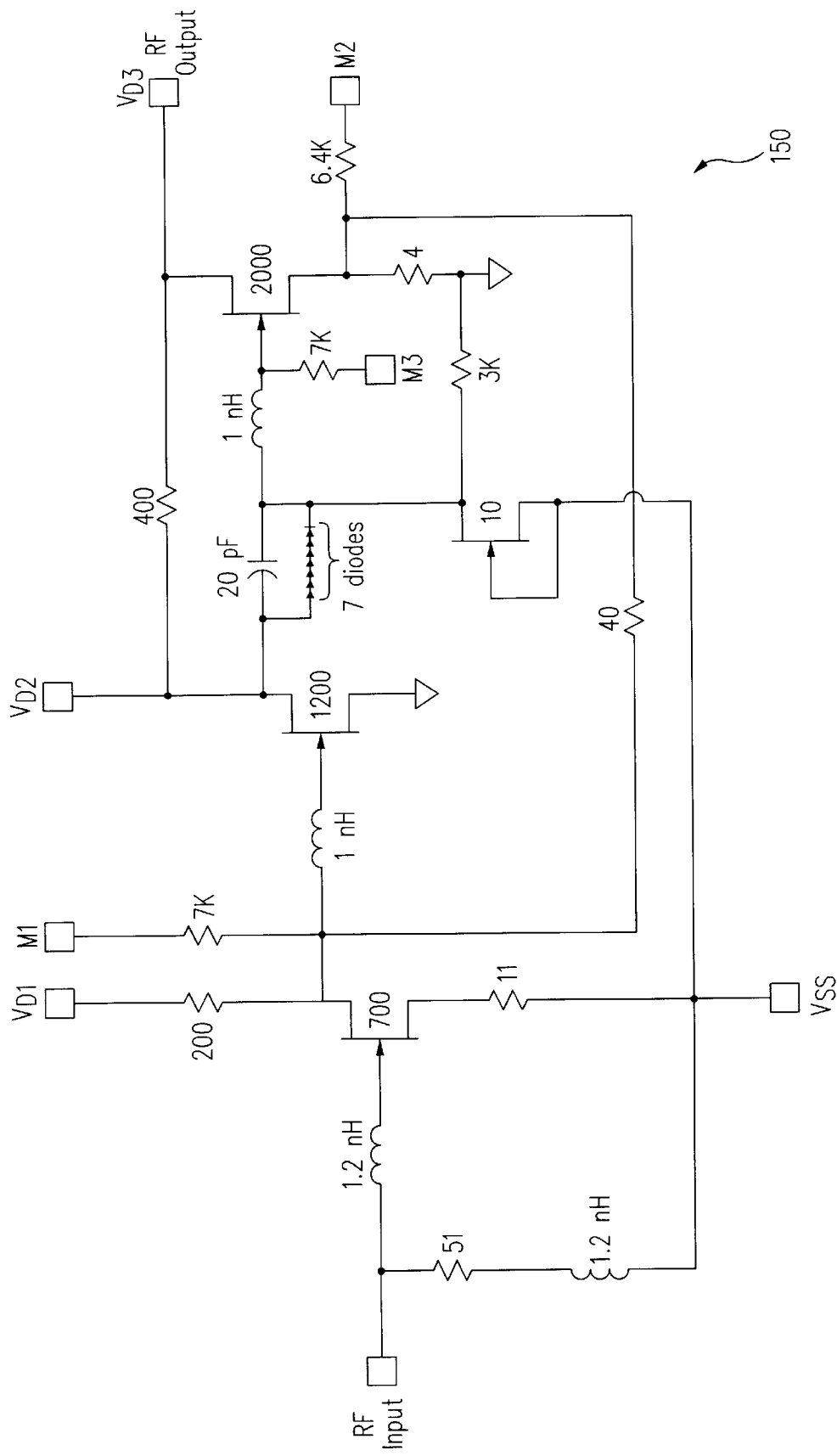
FIG. 12 is an exemplary schematic diagram of a driver amplifier used in the LMDS transceiver.

In one embodiment, driver amplifier 150 has a gain of at least 17 dB, a noise figure less than 2.5 dB, a third-order intercept (IP$_3$) greater than 20 dBm, and a frequency range of at least 23.5–26.35 GHz. Referring to FIG. 12, an exemplary schematic diagram of driver amplifier 150 is shown. One possible biasing scheme for driver amplifier 150 is to set $V_{SS}=-5V$, $V_{D1}=V_{D3}=+8V$ and $V_{D2}=+5V$. $V_{D2}$ and $V_{D3}$ are preferably biased through a high impedance across the desired operating frequency range.

Referring again to FIG. 11, the output of driver amplifier 150 is provided to a diplexer silver plated filter 152. In one embodiment, filter 152 is a multistage resonant waveguide filter with eight poles and four, five or six zeros, a bandwidth of 450 MHz, a center frequency of 28.24 GHz, a pass band of 250 MHz, a band edge of 27.32 GHz at -2.723 dB at -50° C. and 27.825 GHz at -8.716 dB at 65° C., a high-end rolloff of 27.95 at -52 dB, a low-end rolloff of 28.06 GHz at -4 dB and an insertion loss of 1.5 dB. With these design parameters, filter 152 may be of conventional design. Driver amplifier 150 and filter 152 may be integrated on a single GaAs p-HEMT chip.

Figure 13:
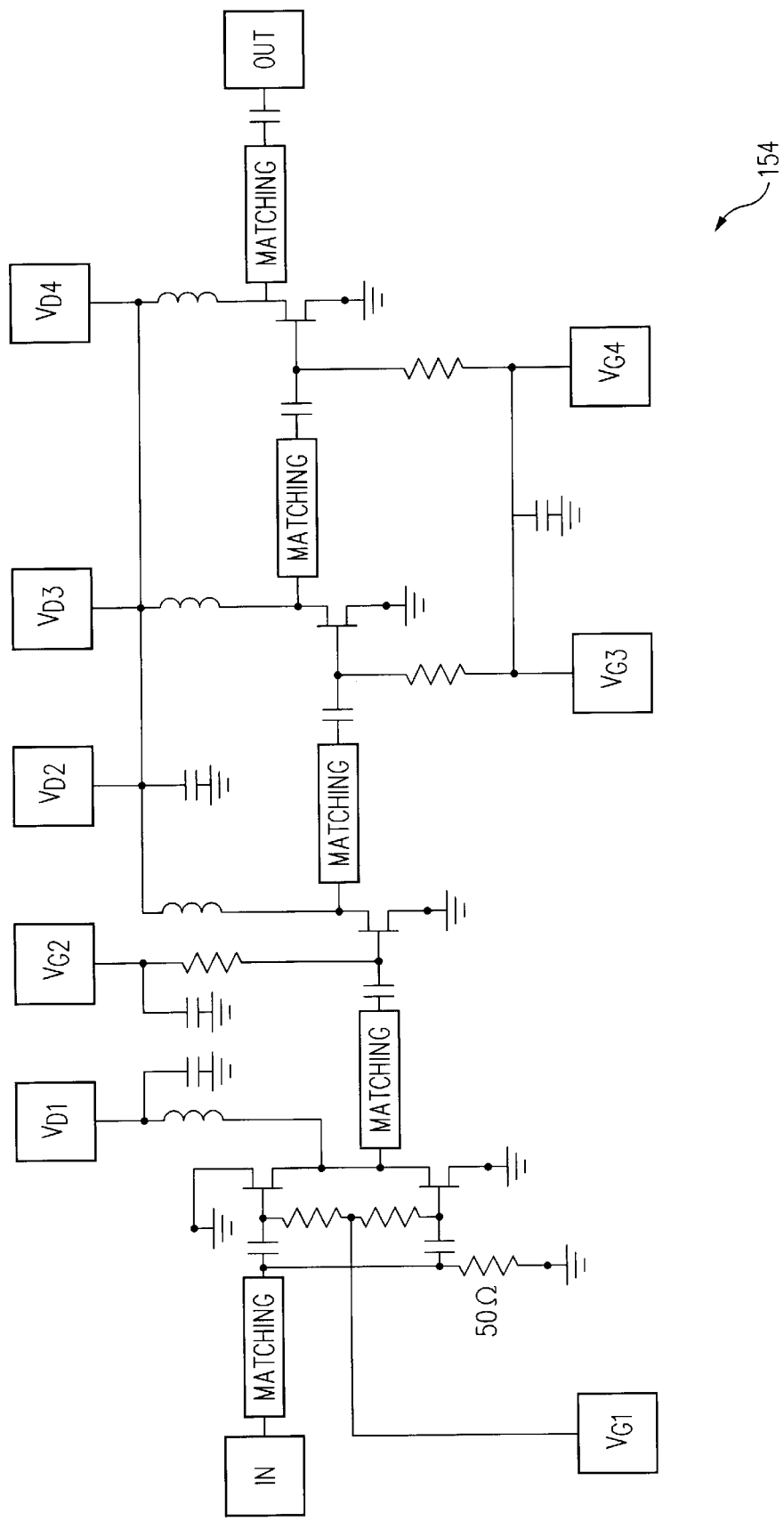
FIG. 13 is an exemplary simplified schematic diagram of an output amplifier used in the LMDS transceiver.

The output signal from filter 152 is provided to output amplifier 154. In one embodiment, output amplifier 154 has a gain of at least 17 dB, a noise figure less than 2.5 dB, a third-order intercept (IP$_3$) greater than 20 dBm, and a frequency range of at least 23.5–26.35 GHz. Referring to FIG. 13, an exemplary simplified schematic diagram of output amplifier 154 is shown. One possible biasing scheme for output amplifier 154 is to set $V_{D1}=V_{D2}=V_{D3}=V_{D4}=4.5V$, and to set the gate voltages $V_{D1}=V_{D2}=V_{D3}=V_{D4}$ to an adjustable negative voltage.

Signal processing block 116 is designed in a substantially similar fashion to signal processing block 114. Thus, the design of signal processing block 116 will not be described in detail. Signal processing block 116 is designed to up-convert an incoming signal to a frequency range of 26.35–31.3 GHz, and its two mixers are designed accordingly. The components of signal processing block 116 may be substantially similar to the components of signal processing block 36, to the extent that the chips of the two signal processing blocks may share common footprints as described below. In one embodiment, filter 120, sub-harmonic mixing system 122 and amplifier 124 may be elements shared between signal processing blocks 114 and 116, eliminating the need for duplication of these components. In this embodiment, only the double-balanced mixing system 118 is unique to each signal processing block.

The outputs of signal processing blocks 114 and 116 are supplied to an output switch 156 controlled by controller 26. Output switch 156 determines which one of the signal processing blocks 114, 116 supplies a signal to orthomode transducer 24.

It will be appreciated that the similarity of design between the transmit and receive portions of transceiver 14 allows "common footprint" chips to be used in both portions of the transceiver. For example, a GaAs MESFET chip carrying the components of sub-harmonic mixing system 122 of signal processing block 34 may share a common footprint with a chip carrying the components of sub-harmonic mixing system 70 of signal processing block 114. Similarly, double-balanced mixing systems 74 and 117 may share a common footprint. This aspect of the present invention allows for considerable design efficiency and production cost savings.

Figure 14:
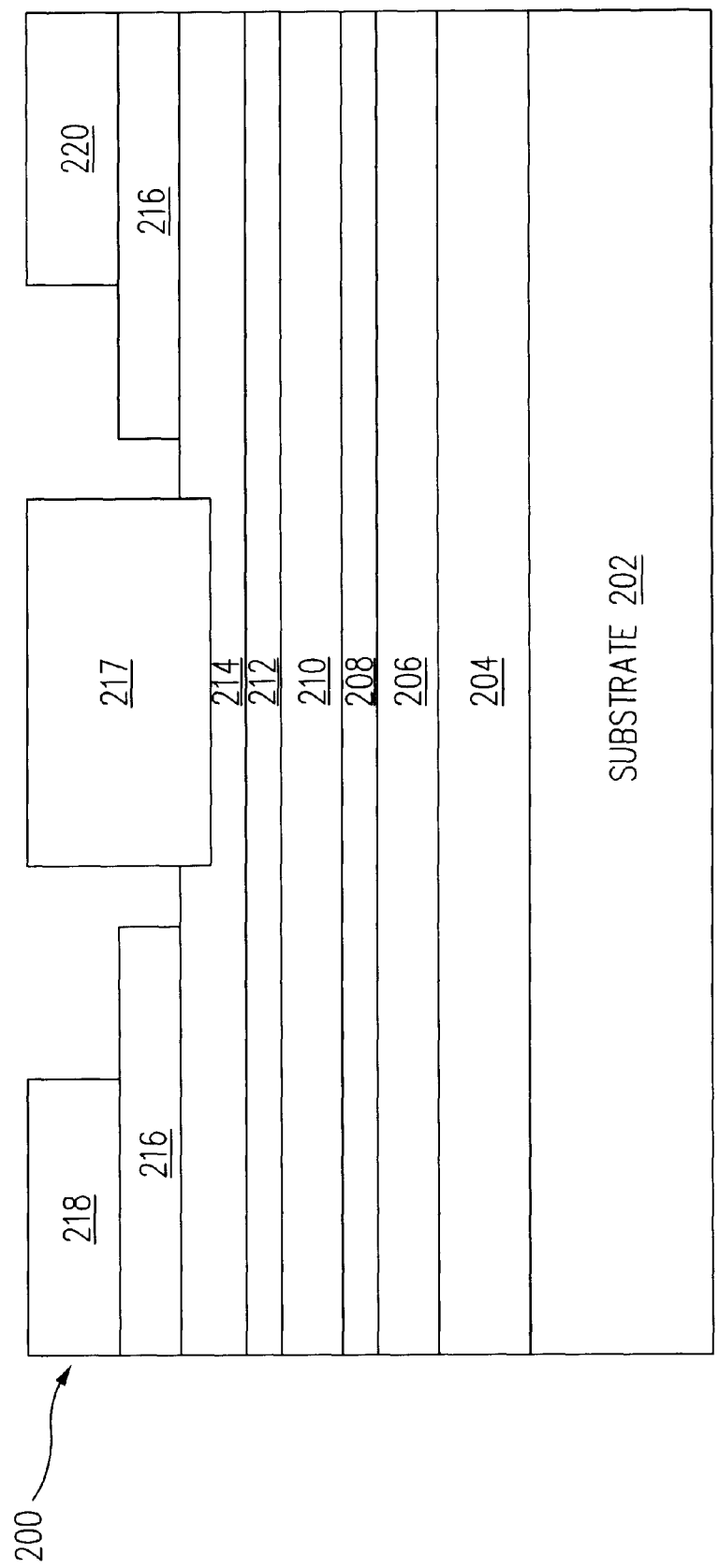
FIG. 14 is a cross section of a p-HEMT amplifier transistor structure for use in amplifiers of the LMDS transceiver.

As described above, amplifiers 38 and 102 and driver amplifier 150 may be fabricated using p-HEMT technology. Referring to FIG. 14, a cross section of a p-HEMT amplifier transistor structure 200 for use in amplifiers 38, 102 and 150 is shown. Transistor structure 200 has optimized power output characteristics, as will become apparent from the following description.

Transistor structure 200 includes an undoped GaAs substrate 202 with a thickness of, for example, 6000 angstroms.

This is the intrinsic buffer layer. Overlying substrate 202 is a sandwich layer 204 with a thickness of, for example, 2000 angstroms. In one embodiment, sandwich layer 204 is composed of alternating layers of undoped AlGaAs (185 angstroms) and undoped GaAs (15 angstroms). In this embodiment, there are ten layers of AlGaAs interleaved with ten layers of GaAs, for a total thickness of 2000 angstroms. Sandwich layer 204 may be grown on substrate 202 in a series of epitaxial growth steps. Sandwich layer 204 is the superlattice buffer layer.

Over sandwich layer 204, a layer 206 of undoped $Al_{0.25}Ga_{0.75}As$ with a thickness of, for example, 200 angstroms is epitaxially grown. This layer is pulse doped with silicon to a dopant concentration of $1.5 \times 10^{-12}$ $cm^{-3}$. Another layer 208 of undoped $Al_{0.25}Ga_{0.75}As$ with a thickness of, for example, 30 angstroms is then epitaxially grown over layer 206. Layer 208 is an intrinsic spacer layer.

Next, a channel layer 210 of $In_{0.16}Ga_{0.84}As$ with a thickness of, for example, 170 angstroms is epitaxially grown over layer 208. The thickness of channel layer 210 is optimized to achieve maximum output power from transistor structure 200. If channel layer 210 is too thick, strain is induced in the surrounding AlGaAs layers, which reduces the conductivity of channel layer 210. If channel layer 210 is too thin, the conductivity of channel layer 210 is also reduced. While the optimum thickness for channel layer 210 depends in part on the aluminum content of the layer, a thickness of approximately 100–200 angstroms has been found to be ideal for an aluminum content of 15%–30%.

Over channel layer 210, an intrinsic spacer layer 212 of undoped $Al_{0.25}Ga_{0.75}As$ with a thickness of, for example, 30 angstroms is epitaxially grown. This layer is pulse doped with silicon to a dopant concentration of $4.0 \times 10^{-12}$ $cm^{-3}$. A layer 214 of $Al_{0.25}Ga_{0.75}As$ doped with silicon to a concentration of $1.0 \times 10^{-16}$ $cm^{-3}$ is then epitaxially grown to a thickness of, for example, 300 angstroms, followed by a layer 216 of GaAs doped with silicon to a concentration of $1.0 \times 10^{-17}$ $cm^{-3}$ epitaxially grown to a thickness of, for example, 200 angstroms.

Source and drain contact regions 218 and 220 are formed from, for example, AuGe/Ni/Ag/Au alloyed at 420° C. to give a contact resistance below 0.25 ohm-mm. The active area may be isolated by a boron ion implantation prior to the contact metal alloy step.

A dual recess etching process is used to form a gate recess in layers 216 and 214. Both etching steps may be performed using a non-selective citric acid etchant. A gate contact region 217 is then formed by Schottky contacts with Mo/Au, Ti/Au or Pt/Au. Barrier heights of 0.603 eV, 0.621 eV and 0.738 eV are obtained for Mo/Au, Ti/Au and Pt/Au contacts, respectively. Threshold voltage, transconductance, $f_t$ and $f_{max}$ are all influenced more strongly by the choice of gate metallization than can be explained by the difference in Schottky barrier height alone. Devices with Ti/Au gates exhibit an effective gate-to-channel spacing that is 17.5 Å smaller than identically processed Mo/Au gate devices, while Pt/Au gate devices exhibit effective gate-to-channel spacing that is 47.8 Å smaller than that of Mo/Au devices.

The source, drain and gate contact formation steps described above, as well as the other steps previously described, may be carried out using standard GaAs lithography techniques.

It will be appreciated that the use of transistor structure 200 in p-HEMT amplifiers such as amplifiers 38 and 102 and driver amplifier 150 provides maximum power output for those amplifiers. This allows the use of fewer amplification stages, thereby decreasing chip surface area and reducing the amount of internal impedance matching required.

Although the present invention and its advantages have been described in detail, it should be understood that various changes, substitutions, and alterations can be made therein without departing from the spirit and scope of the invention as defined by the appended claims.

I claim:
1. A radiofrequency signal processing system comprising:
   a radiofrequency signal processing device having an input terminal and an output terminal;
   a DC blocking system having a quad arrangement of capacitive elements, the DC blocking system being coupled between a radiofrequency input signal source and the input terminal of the radiofrequency signal processing device;
   an RF filter system having a quad arrangement of capacitive elements, the RF filter system being coupled between the DC blocking system and a ground node; and
   a diode system having a quad arrangement of diode elements, the diode system being coupled in series with the DC blocking system between the radiofrequency input signal source and the input terminal of the radiofrequency signal processing device.

2. The radiofrequency signal processing system of claim 1, wherein each capacitive element comprises a capacitor.

3. The radiofrequency signal processing system of claim 1, wherein each capacitive element of the DC blocking system comprises a quad arrangement of capacitors.

4. The radiofrequency signal processing system of claim 1, wherein each diode element comprises a diode.

5. The radiofrequency signal processing system of claim 1, wherein each diode element comprises a quad arrangement of diodes.

6. The radiofrequency signal processing system of claim 1, further comprising a second diode system having a quad arrangement of diode elements, the second diode system having an input terminal connected to a first side of the quad arrangement of diode elements and an output terminal connected to a second side of the quad arrangement of diode elements, the input terminal of the second diode system being coupled to the output terminal of the radiofrequency signal processing device.

* * * * *